United States Patent [19]

Nakano et al.

[11] E Patent Number: Re. 33,499

[45] Reissued Date of Patent: Dec. 18, 1990

[54] METHOD AND APPARATUS FOR THE CONTROL OF VALVE OPERATIONS IN INTERNAL COMBUSTION ENGINE

[75] Inventors: Yoshikatsu Nakano, Kawagoe; Masaaki Matsuura, Tokyo, both of Japan

[73] Assignee: Honda Giken Kogyo Kabushiki Kaisha, Tokyo, Japan

[21] Appl. No.: 107,394

[22] Filed: Oct. 8, 1987

Related U.S. Patent Documents

Reissue of:

[64] Patent No.: 4,545,342
Issued: Oct. 8, 1985
Appl. No.: 596,752
Filed: Apr. 4, 1984

[51] Int. Cl.[5] ..... F02B 77/00

[52] U.S. Cl. ..... 123/198 F; 123/90.16; 123/90.44; 123/308; 123/315

[58] Field of Search ..... 123/198 F, 90.16, 308, 123/90.44, 315

[56] References Cited

U.S. PATENT DOCUMENTS

| | | | |
|---|---|---|---|
| 3,234,924 | 2/1966 | May | 123/323 |
| 3,991,729 | 11/1976 | Notaro | 123/90.16 |
| 4,285,310 | 8/1981 | Takizawa et al. | 123/432 |
| 4,343,268 | 8/1982 | Stang et al. | 123/315 |
| 4,354,463 | 10/1982 | Otani et al. | 123/308 |
| 4,378,765 | 4/1983 | Abermeth et al. | 123/321 |
| 4,442,806 | 4/1984 | Matsuura et al. | 123/90.16 |
| 4,473,047 | 9/1984 | Jakuba et al. | 123/90.16 |

FOREIGN PATENT DOCUMENTS

| | | | |
|---|---|---|---|
| 51907 | 4/1980 | Japan | 123/90.44 |
| 34914 | 4/1981 | Japan | 123/90.16 |
| 172422 | 10/1983 | Japan | 123/90.16 |

*Primary Examiner*—E. Rollins Cross
*Attorney, Agent, or Firm*—Lyon & Lyon

[57] ABSTRACT

An apparatus and a method for controlling the operation of intake and exhaust valves of an internal combustion engine having a plurality of intake and exhaust valves for each cylinder to provide an optimum engine output at all operating speeds. When the engine is rotating at a low speed, a part of both of the intake and exhaust valves are rendered inoperative. When the engine is rotating at a medium speed, all of the intake valves are made operative and a part of the exhaust valves are rendered inoperative. Finally, when the engine is rotating at a high speed, all of both of the intake and exhaust valves are rendered operative.

12 Claims, 4 Drawing Sheets

METHOD AND APPARATUS FOR THE CONTROL OF VALVE OPERATIONS IN INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

The present invention relates to an apparatus for controlling the valves of a four-cycle internal combustion engine. More specifically, the invention relates to a valve control apparatus which renders certain valves inoperative in accordance with the operating conditions of the engine.

In a high-speed four-cycle internal combustion engine, the valve overlap time, that is, the time during which both of the intake and exhaust valves in a cylinder are open is prolonged so that the inertial effect of intake and exhaust gases is utilized to increase the output of the engine. The inertial effect of intake and exhaust gases is useful when the engine is operating at a high speed, but when operating at a low speed, an accompanying reduction in the quantity of the fuel-air mixture introducted into the engine makes the speed thereof insufficient and gives rise to the excess recirculation of exhaust gas. These factors have an adverse effect on combustion, and tend to lower the output of the engine.

There has, therefore, been proposed an engine having a plurality of intake and exhaust valves for each cylinder. When the engine is operating at a low speed, predetermined ones of the intake and exhaust valves are rendered inoperative to increase the flow speed of the fuel-air mixture to thus improve the inertial effect of intake gases and restrict the recirculation of exhaust gas. This engine, however, does not achieve a satisfactory improvement in output during its operation at a medium speed.

In view of these difficulties, it is an object of the invention to provide an internal combustion engine having a maximum output at all engine speeds.

SUMMARY OF THE INVENTION

The invention provides an apparatus for the control of valve operations in an internal combustion engine having a plurality of intake and exhaust valves for each cylinder in which a part of each of the intake and exhaust valves are rendered inoperative when the engine is operating at a low speed, all of the intake valves are operated and a part of the exhaust valves rendered inoperative when the engine is operating at a medium speed, and all of the intake and exhaust valves are operated when the engine is operating at a high speed.

DESCRIPTION OF THE PREFERRED EMBODIMENTS

Figure 1:
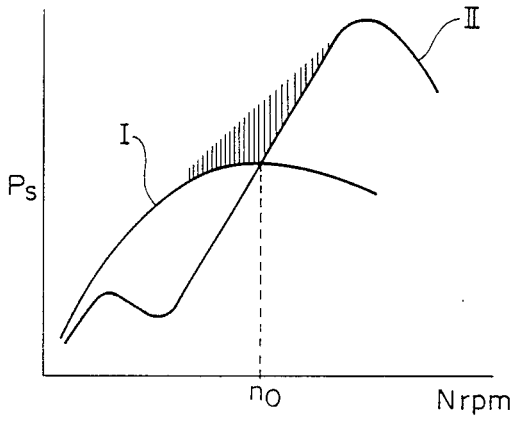
FIG. 1 is a graph comparing the output of a four-cycle engine having a plurality of intake and exhaust valves when a part of each of the intake and exhaust valves are placed out of operation (I) and its output obtained when all of the intake and exhaust valves are placed in operation (II)

As stated above, a high speed internal combustion engine having a plurality of intake and exhaust valves provides an improved output if a part of the intake and exhaust valves are placed out of operation, when the engine is operating at a low speed. This point will be explained with reference to FIG. 1. FIG. 1 is a graph showing the output $P_s$ of an engine in relation to its speed of rotation N (rpm). Curve I shows the output characteristics obtained by placing a part of each of the intake and exhaust valves out of operation, and curve II shows the output characteristics obtained by placing all of the intake and exhaust valves in operation. As is obvious from a comparison of curves I and II, it is possible to produce an improved output for both low and high speeds of the engine if the operating conditions of curve I are employed when the engine speed is lower than $n_0$, and those of curve II when the engine speed is $n_0$ or higher.

An output characteristic curve formed by combining that portion of curve I which corresponds to an engine speed lower than $n_0$ and that portion of curve II which corresponds to an engine speed of $n_0$ or higher, however, provides a reduced output at medium speeds, as shown by hatching in FIG. 1. In other words, the engine fails to provide a satisfactory output at medium speeds in the vicinity of $n_0$.

This is apparently due to the following reasons. If the engine speed increases from a low range to a medium range lower than $n_0$, the engine fails to receive a sufficient supply of the fuel-air mixture since part of the intake valves are out of operation, despite a greater inertial effect of the intake than when the engine is operating at a low speed. Because the engine is of a high-speed type in which the valve overlap time during which all of the intake and exhaust valves in each cylinder are simultaneously open for a time so as to achieve a maximum output at a high speed, a medium speed range of $n_0$ or higher is still so low that a relatively large quantity of exhaust gas is recirculated into the fresh fuel-air mixture, thereby lowering its combustibility. Also, the recirculation of hot exhaust gas results in an elevated cylinder temperature and thereby a lower charging efficiency.

It has been discovered that an improved engine output can be obtained in the medium speed range (shown by hatching in FIG. 1) if all of the intake valves are placed in operation so that the inertial effect of the intake is utilized to introduce an increased quantity of the fuel-air mixture, and if a part of the exhaust valves are rendered inoperative to restrict the recirculation of exhaust gas.

Figure 2:
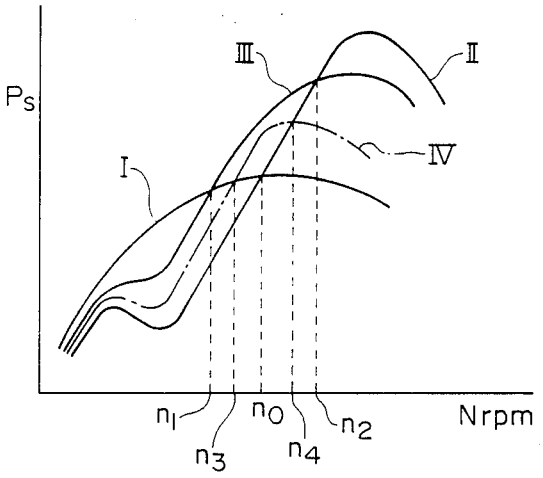
FIG. 2 is a graph comparing the output characteristics of curves I and II, the output obtained when all of the intake valves are placed in operation and a part of the exhaust valves out of operation (III) and the output obtained when a part of the intake valves are placed out of operation and all of the exhaust valves in operation (IV)

FIG. 2 compares curves I and II with a curve III showing the output characteristics obtained by placing all of the intake valves in operation and a part of the exhaust valves out of operation. Curve III lies above curves I and II when the engine speed is in the range of $n_1$ to $n_2$ (which corresponds to the hatched area in FIG. 1). In FIG. 2, $n_1$ is the engine speed at which curve III crosses curve I and $n_2$ is the engine speed at which it crosses curve II.

Curve IV shows, on the contrary, the output characteristics obtained by placing a part of the intake valves out of operation and all of the exhaust valves in operation. The engine speed $n_3$ at which curve IV crosses curve I is higher than $n_1$, while the speed $n_4$ at which curve IV crosses curve II is lower than $n_2$. Although curve IV enables an improved output at an engine speed in the range of $n_3$ to $n_4$, it is more effective to select curve III since it lies above curve IV in the speed range of $n_1$ to $n_2$.

Thus, in accordance with invention, it is possible to obtain smooth output characteristics over the entire range between low and high speeds (1) if curve I, obtained by placing a part of each of the intake and exhaust valves out of operation is selected at an engine speed lower than $n_1$, (2) if curve III, obtained by placing all of the intake valves in operation and a part of the exhaust valves out of operation, is selected at a speed of $n_1$ to $n_2$, and (3) if curve II, obtained by placing all of the intake and exhaust valves in operation, is selected at a speed of $n_2$ or higher.

Figure 4:
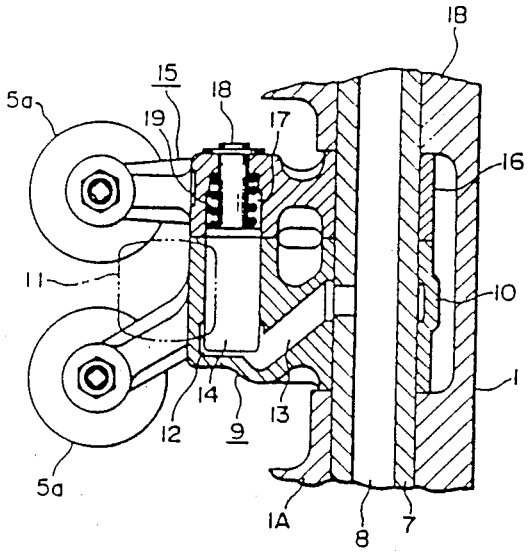
FIG. 4 is a fragmentary sectional view taken along a line IV—IV in FIG. 3.
Figure 5:
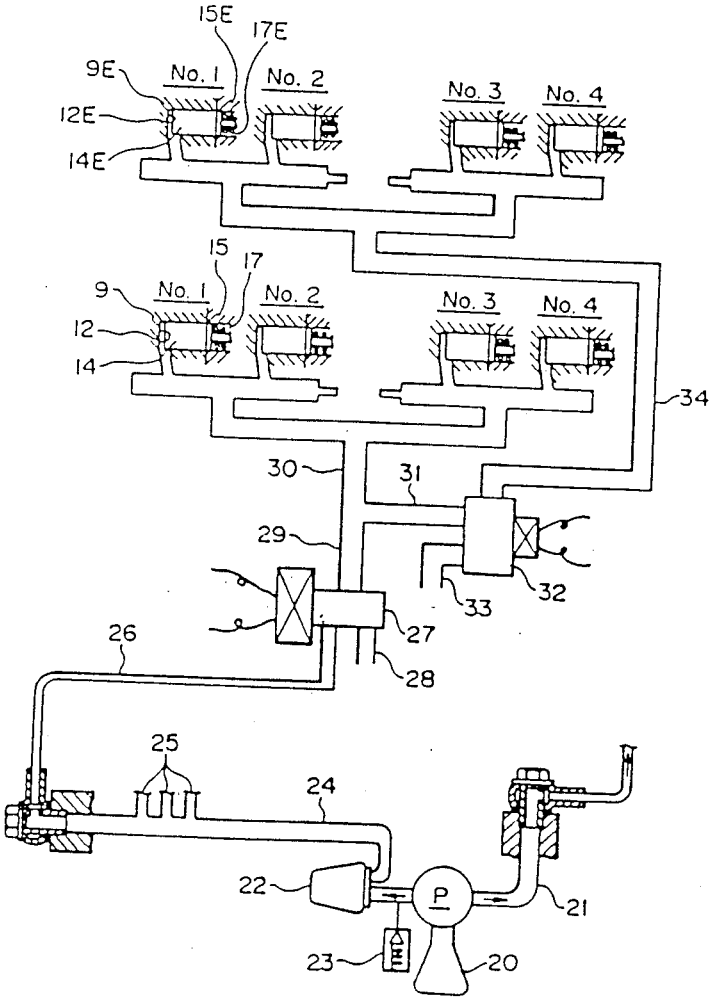
FIG. 5 is a schematic view showing a mechanism for the hydraulic control of valve operation in the engine.

The invention will now be described more specifically by way of example with reference to FIGS. 3 to 5.

Figure 3:
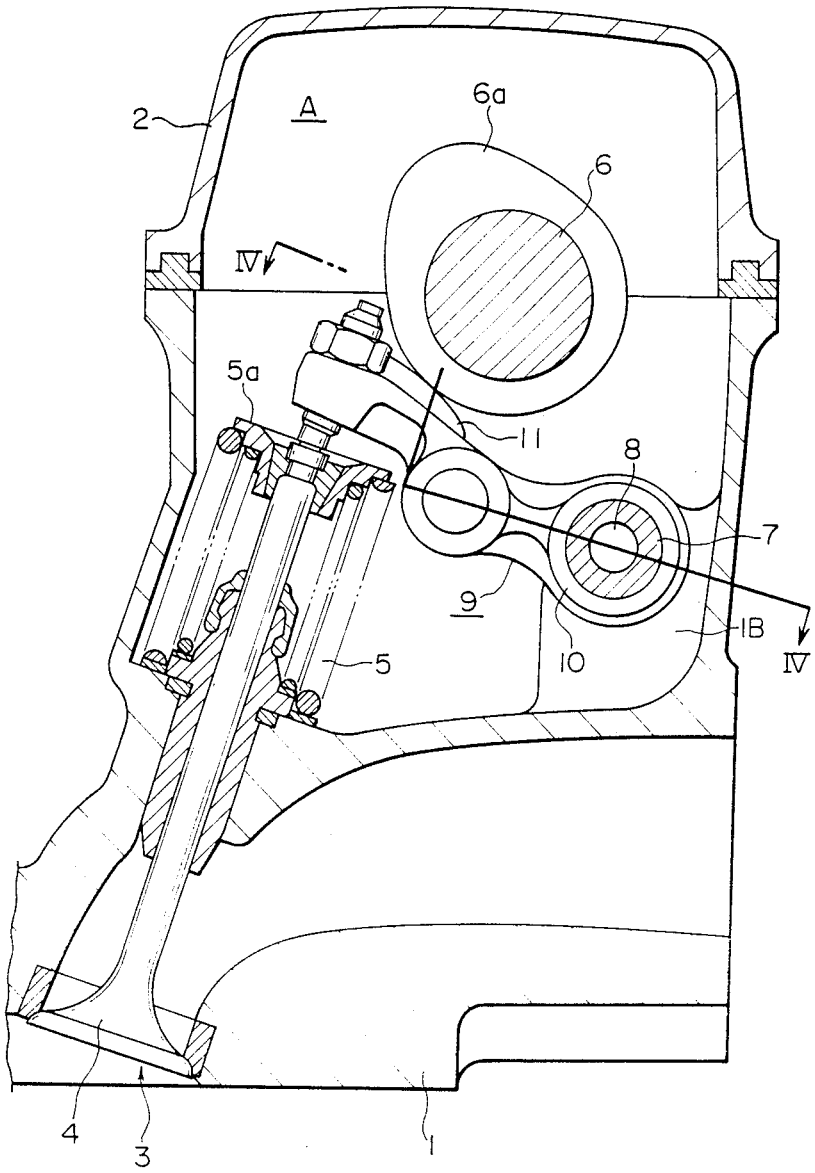
FIG. 3 is a fragmentary side elevational view, partly in section, of the cylinder head of a four-cycle, four-cylinder engine for a two-wheeled motor vehicle showing an intake valve operating mechanism embodying the invention.

FIG. 3 is a fragmentary side elevational view, partly in section, of a cylinder head for a four-cycle, four-cylinder engine in a two-wheeled motor vehicle, showing a valve operating mechanism on the intake side of the engine. The valve operating mechanism on the exhaust side is substantially similar in construction to the mechanism on the intake side and will therefore not be described.

The cylinder head 1 has a pair intake ports 3 which are opened and closed by a pair of intake valves 4. Each intake valve 4 is provided with a coiled compression spring 5 which urges the valve 4 in the direction in which it closes the intake port 3.

A cam shaft 6 is rotatably supported by the cylinder head 1 and a cam shaft holder and disposed in a valve operating chamber A surrounded by a cylinder head cover 2. A timing sprocket (not shown) is rotatably carried on one end of the cam shaft 6 and connected by a timing chain to a timing sprocket on a crankshaft.

A hollow rocker arm shaft 7 having an oil passage therein is supported on rocker arm shaft holders 1A and 1B forming an integral part of the cylinder head 1. A pair of rocker arms 9 and 15 are rotatably supported on the rocker arm shaft 7 (see FIG. 3 and FIG. 4, the latter being a fragmentary sectional view taken along the line IV—IV in FIG. 3). The rocker arm 9 has a bearing portion 10 engaging the rocker arm shaft 7, a seat 11 on which a cam 6a on the cam shaft 6 rests slidably, a hydraulic cylinder 12 in which a piston 14 is reciprocatably disposed, and an oil passage 13 connecting the oil passage 8 and the hydraulic cylinder 12. The rocker arm 15 has a bearing portion 16 engaging the rocker arm shaft 7, and a hollow space 17 in which a guide pin 18 urged by a coiled compression spring 19 is slidably disposed.

If the hydraulic cylinder 12 has an elevated oil pressure, the piston 14 advances into the hollow space 17 of the rocker arm 15 and depresses the guide pin 18 upon overcoming the force of the coiled compression spring 19. On the other hand, if the pressure of oil in the hydraulic cylinder 12 remains low, the spring 19 urges the guide pin 18 to bear against the piston 14 and thereby force it to its retracted position within the hydraulic cylinder 12. The coiled compression spring 19 is supported by a retainer 5a.

A mechanism used for the hydraulic control of the valve operation will be described with reference to FIG. 5. In FIG. 5, the suffix E added to some reference numerals indicates components on the exhaust side. For example, 14E denotes a piston for an exhaust valve. The four cylinders are indicated by No. 1 to No. 4.

Lubricating oil is supplied from an oil pan to the cylinder head through an oil strainer 20, an oil pump P and an oil passage 21. Oil is also supplied toward the crankshaft through an oil cleaner 22, a main chamber 24 and oil passages 25. A pressure regulator is shown at 23.

An oil passage 26 is connected to one end of the main chamber 24, and to a hydraulic control valve 27 for the intake valves to which an oil passage 29 is connected. The oil passage 29 is divided into two oil passages 30 and 31. The oil passage 30 is connected to the hydraulic cylinders 12 in the rocker arms 9 for the intake valves in cylinders No. 1 to No. 4, while the oil passage 31 is connected to a hydraulic control valve 32 for the exhaust valves. An oil passage 34, connected to the hydraulic control valve 32, leads to the hydraulic cylinders 12E in the rocker arms 9E for the exhaust valves. Reference numerals 28 and 33 denote return ports for the control valves 27 and 32, respectively.

In the apparatus embodying the invention hereinabove described, the mechanism for the hydraulic control of valve operations operates to place a part of the intake and exhaust valves out of operation or all of them in operation in accordance with the operating condition of the engine as will hereinafter be described.

(1) Low Speed Operation (below $n_1$):

The hydraulic control valve 27 for the intake valves is placed out of operation (low pressure output), and hence hydraulic oil returns to the oil pan through the return port 28. As no hydraulic oil is supplied to the hydraulic cylinders 12 and 12E, the pistons 14 and 14E stay in their retracted position. The rocker arms 9 and 15 or the rocker arms 9E and 15E are not connected to each other, and only the rocker arms 9 and 9E function to thus keep one of a pair of intake valves and one of a pair of exhaust valves out of operation. This is the position in which the output shown by curve I in FIG. 2 is obtained.

(2) Medium Speed Operation ($n_1$ to $n_2$):

The hydraulic control valve 27 for the intake valves is in operation (high pressure output), and hydraulic oil is supplied to the hydraulic cylinders 12 through the oil passages 29 and 30. The piston 14 advances into the hollow space 17 and thereby connects the rocker arms 9 and 15. Both of the rocker arms 9 and 15 then operate, and all of the intake valves are therefore placed in operation.

Although hydraulic oil is also supplied to the hydraulic control valve 32 for the exhaust valves through the oil passages 29 and 31, it returns to the oil pan through the return port 33 as the valve 32 is still closed. No hydraulic oil is therefore supplied to the hydraulic cylinders 13E, and as the rocker arms 9E and 15E are thus not connected, the rocker arm 15E is still in its inoperative position. Therefore, one of the two exhaust valves is out of operation. This is the position in which the output shown by curve III in FIG. 2 is obtained.

(3) High Speed Operation (above $n_2$):

The hydraulic control valve 27 for the intake valves and the hydraulic control valve 32 for the exhaust valves are both open, and hydraulic oil is supplied to not only the hydraulic cylinder 12, but also the hydraulic cylinder 12E. Therefore, not only the rocker arms 9 and 15, but also the rocker arms 9E and 15E are connected, and hence all of the rocker arms 9, 15, 9E and 15E are in their operative positions so that all of the intake and exhaust valves are placed in operation. This is the position in which the output shown by curve II in FIG. 2 is obtained.

As is evident from the foregoing description, the valve control apparatus of the invention is applicable to an internal combustion engine having a plurality of intake and exhaust valves for each cylinder to place a part of each of the intake and exhaust valve out of operation when the engine is operating at a low speed, place all of the intake valves in operation and a part of the exhaust valves out of operation when the engine is operating at a medium speed, and place all of the intake and exhaust valves in operation when the engine is operating at a high speed, thereby enabling a uniform engine output over the entire range of operation.

We claim:

1. A method for operating the valves of an internal combustion engine having a plurality of cylinders and a plurality of intake valves and a plurality of exhaust valves for each cylinder of said engine, comprising the steps of:

for a low speed of rotation of said engine, placing a part of each of said intake valves and said exhaust valves out of operation;

for a medium speed of rotation of said engine, placing all of said intake valves in operation and a part of said exhaust valves in operation; and for a high speed of rotation of said engine, placing all intake and exhaust valves in operation.

2. An apparatus for controlling the valves of an internal combustion engine having a plurality of intake valves and a plurality of exhaust valves for each cylinder of said engine, comprising:

means for sensing a rotational speed of said engine; and means, operating in response to said speed sensing means, for placing a part of said intake and a part of said exhaust valves out of operation when said sensing indicates said engine is rotating at a low speed, placing all of said intake valves in operation and a part of said exhaust valves out of operation when said engine is rotating at a medium speed, and placing all of said intake and exhaust valves in operation when said engine is rotating at a high speed.

3. The valve control apparatus of claim 2, wherein said second-recited means comprises: means for selectively mechanically linking so as to operate together intake valves of each said cylinder and means for selectively mechanically linking so as to operate together exhaust valves of each said cylinder.

4. The valve control apparatus of claim 3, wherein said means for selectively mechanically linking comprises: a piston slidably disposed in a cylindrical passage formed in a rocker arm of one of each pairs of selectively mechanically linkable valves, and a spring-loaded guide pin mounted in a rocker arm of the other one of each of said pairs of valves opposing said piston, said piston being slidable into a cylindrical passage in which said guide pin is disposed in response to application of a pressure to a side thereof opposite said guide pin.

5. The valve control apparatus of claim 4, wherein said second-recited means further comprises: a plurality of control valves for selectively supplying a hydraulic fluid under pressure to said pistons.

6. The valve control apparatus of any one of claims 1 through 4, wherein said internal combustion engine has four cylinders, each of said cylinders having two intake valves and two exhaust valves, and wherein said second-recited means places two of said intake valves and two of said exhaust valves out of operation when said engine is rotating at said low speed and places two of said exhaust valves out of operation when said engine is rotating at said medium speed.

*7. A method of operating the valves of an internal combustion engine having a plurality of cylinders and a plurality of intake valves and a plurality of exhaust valves for each cylinder of said engine, comprising the steps of:*

*for a low speed rotation of said engine, placing a part of each of said intake valves and said exhaust valves in a first mode of operation and another part of each of said intake valves and said exhaust valves in a second mode of operation different from the first mode of operation, the first mode of operation allowing both the intake and exhaust of more gases through the intake valves and exhaust valves, respectively, than the second mode of operation;*

*for medium speed rotation of said engine, placing all said intake valves in the said first mode of operation and part of said exhaust valves in the first mode of operation and part of said exhaust valves in the second mode of operation; and*

*for high speed rotation of said engine, placing all said intake valves and exhaust valves in the first mode of operation.*

*8. A method of operating the valves of an internal combustion engine having a plurality of cylinders and a plurality of intake valves and a plurality of exhaust valves, comprising the steps of:*

*for a high speed rotation of said engine, operating all of the intake and exhaust valves to a fully open condition for producing a first effective total cross-sectional area of valve opening of maximum magnitude for all the intake and exhaust valves;*

*for a medium speed rotation of said engine, operating the intake and exhaust valves for producing a second effective total cross-sectional area of valve opening of at least the exhaust valves of less than said first effective total cross-sectional area for the exhaust valves; and*

*for a lower speed rotation of said engine, operating the intake and exhaust valves for producing a third effective total cross-sectional area at valve opening less than said second total cross-sectional area.*

*9. A method of operating the valves of an internal combustion engine having a plurality of cylinders and plurality of intake valves and a plurality of exhaust valves, comprising the steps of:*

*for a high speed rotation of said engine, operating all of the intake valves and exhaust valves to a fully open condition for producing a maximum inertial effect in the intake gases and exhaust gases and maximizing the engine output at high speed rotation;*

*for a medium speed rotation of said engine, operating the intake and exhaust valves to a condition for producing a reduced inertial effect in the exhaust gases for restricting the recirculation of exhaust gases into the intake gases while maintaining a high inertial effect in the intake gases for maintaining a high level of fuel-air mixture intake gases into the cylinders for maximizing engine output at medium speed rotation; and*

*for a lower speed rotation of said engine, operating the intake and exhaust valves to a condition for producing a reduced inertial effect in both the intake gases and exhaust gases for restricting the recirculation of exhaust gases into the intake gases and reducing the fuel-air mixture intake gases into the cylinders for maximizing the engine output at lower speed rotation.*

*10. An apparatus for controlling the valves of an internal combustion engine having a plurality of intake valves and a plurality of exhaust valves, comprising:*

*means for sensing a rotational speed of said engine,*

*first hydraulically operated means for modifying the opening operation of at least some of said intake valves,*

*second hydraulically operated means for modifying the opening operation of at least some of said exhaust valves,*

*control means operating in response to said speed sensing means for separately and selectively actuating said first hydraulically operated means and said second hydraulically operated means for providing increasing totals of cross-sectional area of valve openings for increasing engine rotational speeds for increasing the engine power output at said speeds.*

*11. The apparatus of claim 10 wherein said control means operates to provide three different totals of cross-sectional area of valve openings, namely, smallest total area, intermediate total area and largest total area for low speed, medium speed and high speed engine operation, respectively.*

*12. The apparatus of claim 11 wherein said intermediate total area comprises a maximum total area of intake valve openings and a less than maximum total area of exhaust valve openings.*

* * * * *